(12) United States Patent
Tsuno et al.

(10) Patent No.: US 7,080,915 B2
(45) Date of Patent: Jul. 25, 2006

(54) MIRROR SUBSTRATE, MIRROR BODY USING THE SAME, AND OPTICAL DEVICE USING MIRROR BODY

(75) Inventors: Katsuhiko Tsuno, Yokohama (JP); Shoko Suyama, Minato-ku (JP); Tsuneji Kameda, Minato-ku (JP); Yoshiyasu Ito, Minato-ku (JP)

(73) Assignee: NEC Toshiba Space Systems, Ltd., Kanagawa (JP)

( * ) Notice: Subject to any disclaimer, the term of this patent is extended or adjusted under 35 U.S.C. 154(b) by 98 days.

(21) Appl. No.: 10/822,755

(22) Filed: Apr. 13, 2004

(65) Prior Publication Data
US 2004/0246610 A1 Dec. 9, 2004

(30) Foreign Application Priority Data
Apr. 14, 2003 (JP) .............................. 2003-109031

(51) Int. Cl.
*G02B 5/08* (2006.01)
*G02B 7/182* (2006.01)
(52) U.S. Cl. .................... 359/883; 428/912.2; 428/687
(58) Field of Classification Search ................ 359/838, 359/883; 428/912.2, 687
See application file for complete search history.

(56) References Cited

U.S. PATENT DOCUMENTS

| 5,465,170 A | * | 11/1995 | Arimoto ..................... 398/129 |
| 5,637,353 A | * | 6/1997 | Kimock et al. ........ 427/255.34 |
| 5,995,280 A | * | 11/1999 | Beach ........................ 359/366 |
| 6,441,963 B1 | * | 8/2002 | Murakami et al. .......... 359/584 |
| 6,919,127 B1 | * | 7/2005 | Waggoner et al. .......... 428/325 |

FOREIGN PATENT DOCUMENTS

| JP | 1-188454 A | 7/1989 |
| JP | 4-331763 A | 11/1992 |
| JP | 9-178919 A | 7/1997 |
| JP | 2001-316501 A | 11/2001 |
| JP | 2001-348288 A | 12/2001 |
| JP | 2003-57419 | * 2/2003 |

* cited by examiner

Primary Examiner—Alessandro Amari
(74) Attorney, Agent, or Firm—Sughrue Mion, PLLC

(57) ABSTRACT

The present invention adopts a particle dispersed silicon material, comprising silicon carbide as dispersion particles, as a mirror substrate, subjects the mirror substrate to mirror finish polishing to form a mirror body, forms a reflecting film on the mirror body to form a mirror, and uses the mirror to form a large aperture optical system.

23 Claims, 8 Drawing Sheets

TO FIG. 5B

MIRROR SUBSTRATE, MIRROR BODY USING THE SAME, AND OPTICAL DEVICE USING MIRROR BODY

BACKGROUND OF THE INVENTION

1. Field of the Invention

The present invention relates to a mirror body and an optical device using the mirror body.

2. Description of the Related Art

The wavelengths currently used for optical systems include radiowave, infrared ray, visible light, ultra violet light and X-ray. The ultra high frequency wave is referred to as cm wave, mm wave and microwave, depending on the wavelength concerned. The wavelength of the infrared light is 1 mm to 760 nm, and the wavelength of the visible light is 760 to 380 nm. No definite definitions are found for ultraviolet light and X-ray; however, usually, the light in the wavelength range from 380 to 1 nm is referred to as the ultraviolet light and the wavelengths from a few 10 nm to 0.001 nm correspond to X-ray.

For the purpose of resource exploration and meteorological observation, the wavelength regions of microwave and visible, near infrared and infrared light are used. Communication between the satellites and the ground mainly relies on the wavelengths in the GHz band used in the transponder and the optical communication in the wavelengths from 800 nm to 1,000 nm. In these years, the use of the semiconductor laser device around 400 nm, shorter than the conventionally used wavelengths, for the communication between satellites is being studied, because such shorter wavelengths lead to smaller loss due to the air. Additionally, for the purpose of sampling scientific information, observations in the ultraviolet to X-ray region (for example, X-ray astronomy, etc.) have come to be actively carried out. The optical systems handling these wide ranges of wavelengths are required to have a high degree of smoothness with respect to the mirrors. The degree of smoothness of the surface is determined on the basis of the shorter wavelengths of the used wavelengths.

When a mirror is used for handling image information, the degree of smoothness thereof affects the resolution, while when used for communication, the low degree of smoothness thereof results in power loss. Consequently, the degree of smoothness of $\lambda/20$ to $\lambda/50$ is required for communication, which is higher than the degree of smoothness of $\lambda/10$ required for handling image information. Additionally, miniaturization of semiconductors causes reflecting mirrors for the X-ray region to be also used for X-tray lithography, and even for the X-ray having a wavelength of 13 nm, a degree of smoothness of the order of 0.8 nm is required.

In particular, the optical systems for use in space are used in space indeed, and the means for putting the systems on the orbits are spacecrafts such as rockets, so that the systems are required not only to be made high in precision but also to be made light in weight.

Low thermal expansion glass is extremely small in linear expansion coefficient, and has been adopted for the mirror substrates for large optical systems on the ground. Owing to this fact, many large and high-precision optical systems have adopted low thermal expansion glass for the mirror substrate material.

However, low thermal expansion glass is low in rigidity and strength as a material, and hence it is not suitable for reduction of weight and additionally, for the uses requiring the degree of smoothness of the order of 1 nm.

Beryllium is a metal and suitable for weight reduction as far as the rigidity and strength of the material are concerned. On the other hand, beryllium is a metallic material and large in thermal expansion coefficient, but its linear expansion coefficient is also large, so that beryllium is not suitable for high precision mirrors for use in space. Additionally, beryllium is harmful and is restricted in the processing place therefor, and moreover is associated with a problem such that a workpiece of beryllium should be processed after its surface is coated with another metal such as nickel.

Sintered compact is light in weight, and is high in both rigidity and strength, thus having the properties suitable as substrates of mirrors for use in space. For example, Japanese Patent Laid-Open No. 9-178919 discloses an example in which aluminum nitride sintered compact is used as substrates of mirrors for use in optical systems. Aluminum nitride sintered compact is suitable as far as it is light in weight, rigid and strong, but it is low in thermal conductivity, and moreover abundant in pores, so that it is not suitable for mirror substrates required to have smooth surface.

The adhesive strength between sintered compact and a metal to form the reflecting surface is weak, so that, as disclosed in Japanese Patent Laid-Open 9-178919, it is necessary that a gold thin film to be the reflecting film should be formed on a sintered compact to be used as a mirror substrate through the intermediary of a glass containing $Al_2O_3$/glass layer.

For silicon carbide, research and development thereof has been promoted as materials, high in rigidity and strength, for use in high precision and lightweight optical systems.

Silicon carbide is smaller in linear thermal expansion coefficient than beryllium, but is high in rigidity and strength; silicon carbide is larger in linear thermal expansion coefficient than low thermal expansion glass, but is high in thermal conductivity and the temperature distribution hardly tends to be nonuniform; thus silicon carbide is suitable for substrates of mirrors in high precision optical systems for use in space.

However, there has been a problem that sintered silicon carbide, carbon fiber reinforced silicon carbide, and chemical vapor phase grown silicon carbide are not suitable for substrates of mirrors used in large optical systems.

Sintered silicon carbide is available in two different forms: one is a high purity sintered silicon carbide obtained by sintering a high purity silicon carbide powder at temperatures 2,000° C. or higher, and the other is a composite ceramic sintered compact, as disclosed in Japanese Patent Laid-Open No. 1-188454, in which silicon carbide particles are dispersed in a polycrystalline ($Al_2O_3$) matrix made of anisotropic particles.

The production of silicon carbide on the basis of the chemical vapor phase growth method uses the crystal growth, caused by chemical reaction, from the vapor phase at a high temperature, permitting attaining nearly ideal properties of silicon carbide. Additionally, the above described growth method permits obtaining dense crystals, so that silicon carbide crystals can be grown on the structure bodies made of materials on which high purity sintered silicon carbide and carbon fiber reinforced silicon carbide can be deposited by means of the chemical vapor phase growth method.

Silicon carbide obtained by the chemical vapor phase growth can yield, when mirror finish polishing is made, a mirror which is free from the generation of pores and 1 nm or less in concavities and convexities, and accordingly an ideal mirror available at present as a mirror for an optical system. However, the degree of difficulty of the growth method concerned is increased with increasing mirror substrate size, in relation to the apparatus for chemical vapor phase growth and the growth control of silicon carbide, so that at present an optical system involving an aperture of 0.6 m or more can hardly be produced.

Additionally, a substrate is needed for chemical vapor phase growth, and when sintered silicon carbide is adopted for the substrate, the shape precision offers problems as will be described later on. When a material other than silicon carbide is used for the substrate, the silicon carbide obtained by the chemical vapor phase growth and the substrate are different from each other in thermal expansion coefficient, so that there occur problems such that cracks are generated in the silicon carbide film and the exfoliation of the metal layer forming the reflecting surface from the substrate occurs when silicon carbide is deposited at the time of production, and under such a large temperature variation condition as occurring in space.

A method may be conceivable in which the substrate is removed after the growth of the silicon carbide film; however, this case is also accompanied by the problems associated with production such that cracks are generated in the silicon carbide film when silicon carbide is deposited, and additionally, the film growth is required to yield a larger thickness.

On the contrary, sintered silicon carbide undergoes a contraction as large as 20% in sintering. This makes it difficult to maintain the shape precision. Additionally, the produced silicon carbide is porous, and hence pores of the order of 2 μm are found to occupy about 2% of the surface area when the surface is smoothed. This is the reason why the surface smoothing is required to be performed by depositing silicon carbide by means of the chemical vapor phase growth. The constraint involving deposition by the chemical vapor phase growth also imposes an additional constraint on the upsizing of mirrors.

Carbon fiber reinforced silicon carbide is manufactured in such a way that carbon fiber reinforced graphite is formed by burning a substrate made of a carbon fiber reinforced plastic, and at 1,400° C., silicon is impregnated into the graphite thus obtained and is made to react with the graphite. This production method is suitable for upsizing because this method uses carbon fiber reinforced plastic as the substrate. However, this method makes the carbon fiber to be partially involved in the reaction to form silicon carbide, so that the silicon carbide thus obtained cannot fully enjoy the properties such that the Young's modulus thereof is smaller and is higher in rigidity compared to sintered silicon carbide and silicon carbide produced by the chemical vapor phase growth method. Additionally, the surface of the silicon carbide produced by this method does not permit attaining a degree of smoothness suitable for optical systems for use in the visible light region even when polished because carbon fibers are contained therein. Consequently, the silicon carbide concerned can be used merely for the optical systems for use in the middle and far infrared regions for which the wavelengths are long. For the purpose of using for the optical systems in the visible light region, it is necessary to carry out the silicon carbide coating by means of the chemical vapor phase growth, so that the silicon carbide concerned is also not suitable for production of large size optical mirrors because of the constraint imposed by the chemical vapor phase growth method similarly to the case of the high purity sintered silicon carbide.

It is essential that a mirror substrate either for use in space and for use on the ground is made to be lightweight.

However, for the purpose of being used in optical systems, the mirror substrate is required to be high in rigidity and strength, and moreover, small in linear expansion coefficient and high in thermal conductivity, and yet moreover, high in machining precision.

It is necessary that sintered materials are produced by sintering at high temperatures, and contraction as large as about 20% takes place. Consequently, the shape precision can hardly be maintained.

Additionally, as for a sintered compact as a mirror substrate, for example, in the case of an aluminum nitride sintered compact disclosed in Japanese Patent Laid-Open No. 9-178919, the degree of smoothness of the surface is low, and moreover, the adhesion strength to metal is low, and accordingly it is necessary that a glass containing $Al_2O_3$ layer is formed, and additionally a glass layer is formed on the glass containing $Al_2O_3$ layer, and a reflecting film is formed on the glass layer; thus aluminum nitride sintered compact is not suitable for the mirror substrate for use in a high precision optical system.

On the other hand, in the case of a composite ceramic sintered compact in which silicon carbide particles are dispersed in a polycrystalline ($Al_2O_3$) matrix made of anisotropic particles, there is a problem that when mirror finish polished, pores are found on the surface.

Although silicon carbide is a material suitable for use in space as far as the rigidity, strength and thermal conductivity are concerned, high purity sintered silicon carbide, carbon fiber reinforced silicon carbide and chemical vapor phase growth silicon carbide all do not meet all the requirements, and are not suitable for upsizing.

SUMMARY OF THE INVENTION

The present invention is a mirror substrate, wherein the substrate is made of a particle-dispersed silicon material composed of silicon carbide and silicon, and the material is such that the Vickers hardness thereof is 1,500 Hv or more, the 3 point bending hardness thereof is 500 MPa or more, and the thermal conductivity thereof is 150 W/m·K or more, and the surface to be the reflecting surface of the substrate is mirror surface polished in such a way that the maximum diameter of the concavities and convexities on the surface is 40 nm or less.

A reflecting film is formed on the above described mirror surface to form a mirror body. The present invention includes an optical device in which the mirror body is used for the reflecting surface of a reflection type optical system.

According to the present invention, the use of the particle dispersed silicon material comprising silicon carbide as dispersion particles has made it unnecessary to conduct the silicon carbide film coating by means of the chemical vapor phase growth, which coating is necessary in an optical system fabrication using the conventional silicon carbide sintered compact, and thus the application of the silicon carbide optical system permitting an aperture of 1 m or more to the visible light region has been made possible.

Additionally, the use of the particle dispersed silicon comprising silicon carbide as dispersion particles makes it possible to fabricate a variety of weight saving shapes with the aid of the machining applied to molded bodies before sintering. Furthermore, the shape contraction at the time of sintering is as smaller as 1% as compared to the contractions by other methods, so that the method can be said suitable for the precision improvement in fabrication of large optical systems; additionally, fracture and the like caused by contraction can thereby be easily avoided, so that the method can also be said suitable for the weight reduction of large optical systems.

Additionally, the substrate material described above is excellent in heat resistance, and hence is also excellent as the substrate for reflecting mirrors applied in the energy-rich regions including the X-ray region.

DETAILED DESCRIPTION OF THE INVENTION AND PREFERRED EMBODIMENTS

The present invention provides a mirror in which the mirror substrate is a mirror material high in rigidity, strength, thermal conductivity and degree of smoothness, and suitable for upsizing, and an optical system which uses the mirror.

The present invention obtains a reflecting optical system which is large in size as compared to hitherto developed lightweight optical systems and usable in the wavelength regions including X-ray, near ultraviolet light, visible light, and infrared light (200 nm to 100 μm), by using a particle-dispersed silicon material which is high in rigidity, strength, and thermal conductivity, and permits obtaining a smooth surface with the aid of mirror finish polishing.

Figure 1:
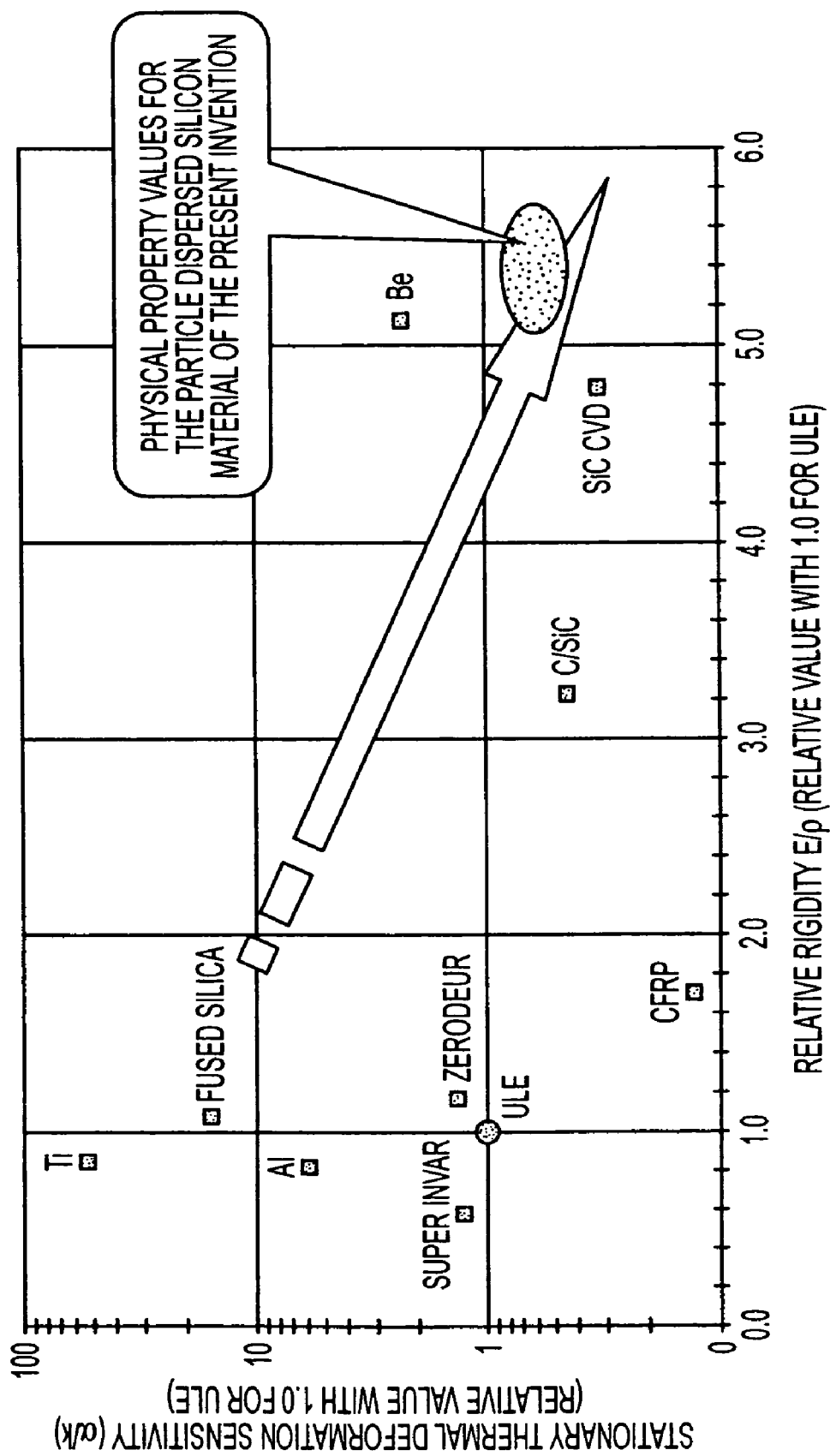
FIG. 1 Comparison of the material used in the present invention with the conventional materials.

FIG. 1 shows a comparative diagram for silicon carbide material based optical materials and metals other than the low thermal expansion glass and particle dispersed silicon material which have hitherto been frequently used for mounting in spacecrafts. The abscissa represents a relative rigidity per unit density as an index for material strength (ratio of Young's E modulus to the material density $\rho$), and the ordinates represents the ratio of the thermal conductivity k to the linear expansion coefficient $\alpha$ as an index indicating the resistance to thermal deformation. As an optical material, the properties thereof become more satisfactory, the point for the material is closer to the origin of the graph along the ordinate and is farther away from the origin along the abscissa.

The particle dispersed silicon material is higher in rigidity than and comparable in fracture toughness value with other materials and silicon carbide prepared by other methods. Thus, the production of optical reflecting mirrors and high precision optical systems, both highly reduced in weight, is made possible, and additionally, upsizing is made possible because the silicon carbide coating by the chemical vapor phase growth, this coating being a factor to hinder upsizing, is made unnecessary.

Additionally, by polishing in a manner similar to that for silicon carbide obtained by the chemical vapor phase growth, the smooth surface can be obtained which is needed for the wavelengths falling in the wavelength range from 200 nm to 1,000 μm, corresponding to the range from the near ultraviolet region to the infrared region.

The degree of smoothness of the mirror is determined by the shortest wavelengths of the wavelengths being used.

For scientific information and image information, the wavelengths from 300 to 1,000 μm are used which correspond to the range from the X-ray region to the range from the near ultraviolet region to the infrared region. In this case, it is preferable that the roughness of the mirror is $\lambda/10$ or less. For X-ray, the roughness is required to be 1 nm or less. On the other hand, for the near ultraviolet region, the roughness can be of the order of 30 nm when the wavelength is 300 nm.

The current optical communication uses light of wavelengths from 800 to 1,000 nm. This is because the optical communication is used for the communication on the ground or the communication between the ground and satellites, and the loss caused by the atmosphere is intended to be avoided; it is anticipated that when the optical communication is used between satellites in the future, the communication using shorter wavelength light will be adopted because the loss caused by the atmosphere is not involved.

When a mirror is used for optical communication, the loss caused by reflection is crucial, so that it is necessary that the roughness of the mirror should be $\lambda/20$ or less, more preferably $\lambda/50$ or less.

In the case of the light of wavelengths from 800 to 1,000 nm currently used for optical communication, the roughness of the mirror is preferably $\lambda/20$ (40 nm) or less, more preferably $\lambda/50$ (16 nm).

On the contrary, the communication between satellites is free from the loss caused by the atmosphere, and hence may use even lower power lasers, and accordingly can also use semiconductor lasers. In this connection, the semiconductor laser using gallium nitride is shortest in wavelength, specifically the wavelength being 400 nm. In this case, the surface roughness is preferably $\lambda/20$ (20 nm) or less, more preferably $\lambda/50$ (8 nm) or less.

In the case of the particle dispersed silicon material comprising silicon carbide and carbon, of the present invention, application of the same polishing as applied to silicon carbide permits attaining a degree of smoothness ranging from 0.8 to 1 nm.

Now, detailed description will be made below on a first embodiment with reference to the accompanying drawings.

Figure 2:
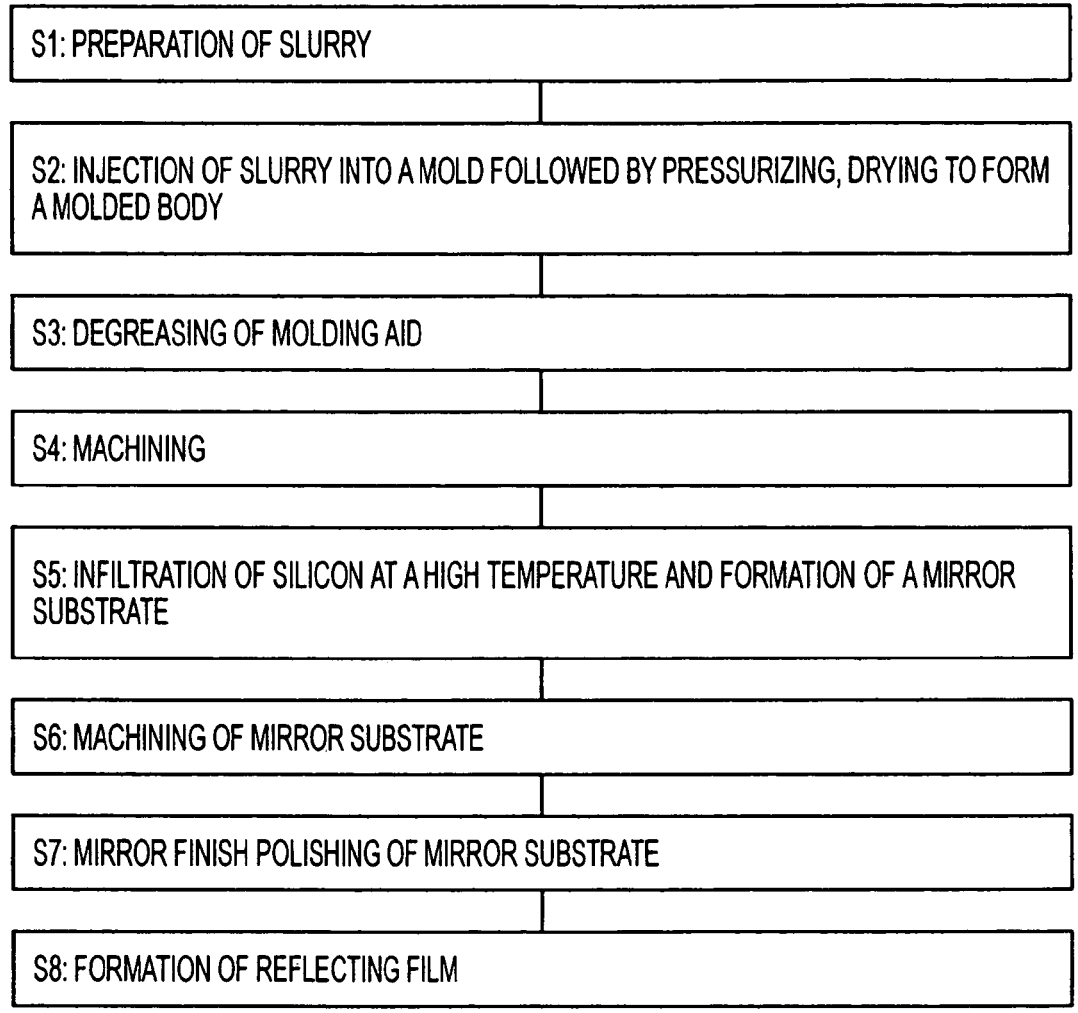
FIG. 2 Diagram showing the production steps of a particle dispersed silicon material.

FIG. 2 is a diagram showing the fabrication steps of a mirror body.

S1 A slurry is obtained by dispersing silicon carbide and carbon powder in an organic solvent.

S2 The slurry is injected into a mold and pressurized and dried.

S3 The molded boy was placed in an inert atmosphere at 600 to 800° C. to degrease the molding aid.

S4 The molded body is machined into a desired shape.

S5 At a high temperature, infiltration of silicon is made, and carbon and silicon are allowed to react with each other to produce silicon carbide and thus yield a mirror substrate.

S6 The mirror substrate is machined into the desired final shape.

S7 The substrate is polished to form a desired surface shape and surface roughness to form the mirror base.

S8 A mirror body is formed by forming a reflecting film on the mirror base.

Figure 3A:
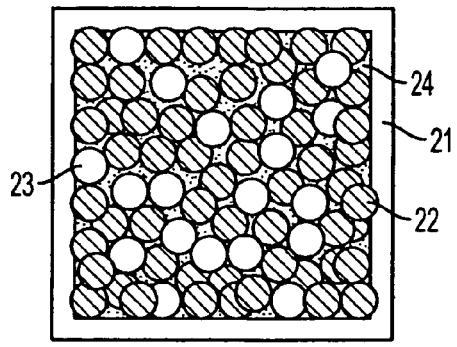
FIGS. 3a–3d Sectional views of the particle dispersed silicon material observed at the respective steps of production thereof.

The particle dispersed silicon material is prepared at the step S1 by dispersing silicon carbide 22 and carbon powder 23 in an organic solvent 24. Then, the slurry is charged into the mold 21, at a pressure of 0.1 to 10 MPa, and thereafter dried (see FIG. 3(a)). The application of pressure in charging is based on the purpose such that the slurry is uniformly injected into the mold 21 having a complex shape. The charging pressure is determined by the shape of the mold 21.

Figure 3B:
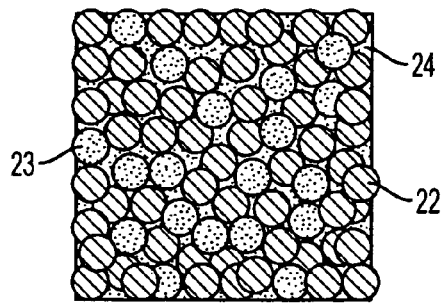
Figure 3C:
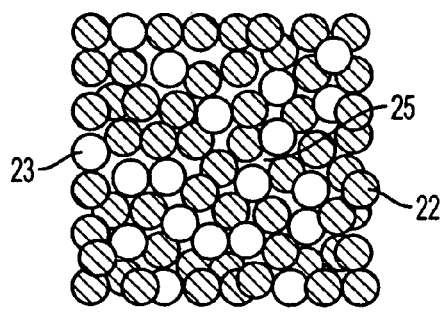

Subsequently, air-drying is conducted to form a molded body (see FIG. 3(b)). Then, at the step S3, the organic matter 24 added as the molding aid is degreased in an atmosphere of nitrogen gas at a temperature of 600 to 800° C. Consequently, the molding aid is degreased and hence pores 25 shown in FIG. 3(c) are formed. These pores are 3 vol % or less in proportion, and usually of the order of 40%.

Figure 3D:
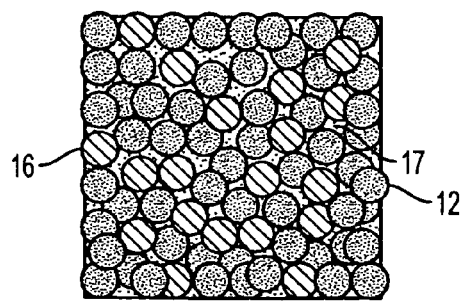

At the step S4, the molded body is machined into a desired shape. The molded body can be easily machined because it is not so hard as a sintered compact sintered at a high temperature of the order of 2,000° C., and provides an effect such that high precision machining can be easily carried out. Then, at the step S5, when silicon is made to infiltrate the molded body at 1,400° C., carbon powder 3 reacts with silicon to be converted to silicon carbide 26, and the pores 25 are charged with silicon 27 (see FIG. 3(d)). Consequently, even when polished, the molded body generates pores to a lesser extent than sintered silicon carbide, so that the pores on the surface occupy 2% or less of the surface area.

If the wettability between silicon and silicon carbide is poor, pores are exposed to the surface at the time of infiltrating silicon, and additionally, the mechanical strength is also degraded; accordingly, the content of the impurities contained in silicon is preferably 0.001% or more and 2% or less. If the impurity content is 2% or less, the mechanical properties cannot be degraded. More desirably, the impurity content is preferably 0.001% or more and 0.05% or less. If the impurity content is 0.05% or less, the wettability between silicon and silicon carbide is satisfactory and accordingly silicon infiltrates the voids between the silicon carbide particles, so that no pores are generated.

The silicon carbide and silicon are both in amorphous condition, so that no concavities and convexities particularly caused by the polishing rate difference between the silicon carbide and the silicon are found at the time of polishing; thus, the concavities and convexities after polishing were 0.8 to 1 nm, to be comparable with those found in a silicon carbide film deposited by the chemical vapor phase deposition.

The polishing was carried out as follows: similarly to the case of the silicon carbide film deposited by the chemical vapor phase growth, pressure lapping was conducted with ceria powder, chromia powder and the like to attain the flatness of the mirror, and then precise polishing was conducted with spherical diamond powder of 0.1 μm in particle size by means of the press polishing method, float polishing methods and the like.

It is preferable that as a mirror substrate, the Vickers hardness thereof is 1,500 Hv or more, the 3 point bending hardness thereof is 500 MPa or more, and the thermal conductivity thereof is 100 W/m-K or more.

EXAMPLE 1

Silicon carbide (100 parts by weight) (Greendensic™ GC powder, manufactured by Showa Denko K. K.) of the maximum particle size of 0.1 μm, 5 μm or 10 μm, 10 parts by weight of carbon powder (carbon black manufactured by Mitsubishi Kasei Co., Ltd.) of the maximum particle sizes of 0.03 μm, 1 μm or 3 μm, and silicon powder were mixed together in such a way that the composition ratio (silicon: silicon carbide) of the mixture was adjusted to be 5 to 20:95 to 80. Polishing substrates were formed with the silicon powder purity of 0.001%, 0.1%, 1% and 2%, and were subjected to examination of mirror surface flatness.

By use of a pressure casting molding machine, charging into the mold was made at a molding pressure of 10 MPa. Additionally, after air drying, the molded body was placed in a nitrogen atmosphere at 600 to 800° C. for 2 hours to remove the organic solvent added as the molding aid, and then heated at 1,400° C. under a reduced pressure and silicon was made to infiltrate the molded body. The contraction generated in the infiltration of silicon was found to be 1%.

The sintered compacts obtained as described above were subjected to mirror finish polishing, and consequently, in all cases, the generation of the concavities and convexities was found in 3% or less of the surface; the maximum diameter of the concavities and convexities was 2 nm for the case where the silicon impurity was 2%; the maximum diameters of the concavities and convexities fall within the range from 0.8 to 1 nm for the cases where the silicon impurities were 0.001%, 0.1% and 1%, the densities being 3%.

The molding pressure was altered to 5 MPa and 1 MPa to produce samples, but the contractions of the samples in infiltration of silicon were not found to be varied.

EXAMPLE 2

The sintered compacts obtained in Example 1 were subjected to polishing, and thereafter gold was deposited in 10 nm thickness by the deposition method on the polished surfaces to be the reflecting surfaces of the mirrors. The thickness of each of the gold films is preferably 10 to 100 nm.

With the gold film thickness of 10 nm or more, the uniformity of the gold film was obtainable, while with the thickness of 100 nm or less, the flatness of each of the films was the same as that of the mirror substrate surface.

In the case of the particle dispersed silicon material with silicon carbide as dispersed particles of the present invention, no bonding layer is needed between the substrate and the gold film, and even the gold film thickness made to be 10 nm did not lead to the exfoliation of the gold film from the substrate.

In addition to gold, silver or rhodium can be used as the metal to form the reflecting film. The cosmic space is a vacuum space, so that aluminum, silver and the like, easily oxidizable on the ground, can be used without causing problems.

When the wavelength is short as for the ultraviolet light of 200 nm or below and X-ray, metallic reflecting films are low in reflectance. Accordingly, it is necessary to use dielectric multi-layer reflecting films which attain high reflectance through the interference actualized by making the phases of the light rays reflected at the respective interfaces in the multi-layer film coincide with each other. The dielectric multi-layer reflecting film is a multi-layer film in which, in addition to the dielectric, as heat resistant films, films made of tungsten and carbon, molybdenum and silicon, $Ta_2O$ film, $TiO_2$—$SiO_2$, Al and a Si compound (for example SiC or SiN), and Si and $MoSiO_2$ are mutually laminated, because the light of 200 nm or below in wavelength is high in energy.

The dielectric multi-layer film is a film in which a high refractive index thin film and a low refractive index film are alternately laminated in this order, and is formed by deposition on the basis of the sputtering method with the aid of a continuous direct current sputtering apparatus.

EXAMPLE 3

Figure 4A:
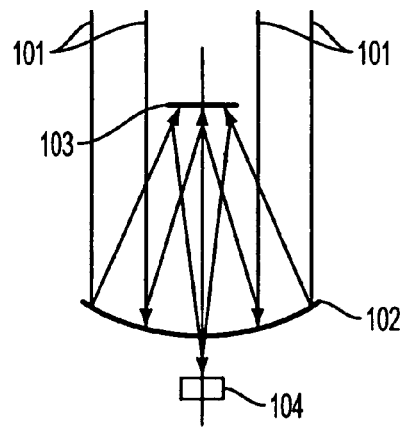
FIGS. 4a–4c Schematic views of reflecting optical systems.

Description will be made below on an optical system incorporating a mirror body made of the particle dispersed silicon material with reference to FIGS. 4(a) and (b). FIGS. 4(a) and (b) are the schematic sectional views of reflection type optical systems.

Figure 4B:
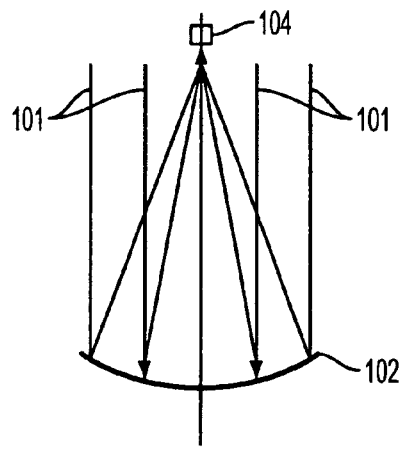

In FIG. 4(a), an incident light beam 101 incident in the optical system is reflected by a first mirror 102 and a second mirror 103 and condensed on a detector 104. In FIG. 4(b), an incident light beam 101 incident reflected by a first mirror 102 is condensed on a detector 104.

It is preferable that when image information is obtained, a parallel light beam is condensed on the detector 104, and accordingly the second mirror has a convex surface. On the other hand, in the case of a communication antenna, it is desirable that the light beam is focused on the detector 104, so that the mirror has a concave surface.

Figure 4C:
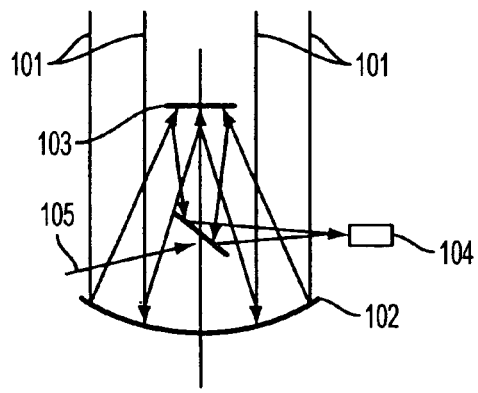

FIG. 4(c) shows an optical system in which a plane mirror 105 was arranged for the purpose of guiding the light beam reflected by the second mirror 103 in FIG. 4(a) toward a side.

As for the detector 104, as the image sensors used for collecting the image data in astronomic observations and the like, photographic plate and then photomultipliers have been used, and currently, semiconductor image sensors including charge coupled device (hereinafter, abbreviated as CCD), cooled sensors, non-cooled sensors and CMOS sensors are being used.

On the other hand, as photodetectors in optical communication, for example, PIN photodiodes, avalanche photodiode and the like are being used.

For scientific information and image information, the wavelengths from 300 to 1,000 μm are used which correspond to the range from the X-ray region to the range from the near ultraviolet region to the infrared region. In this case, it is preferable that the roughness of the mirror is λ/10 or less. For X-ray, the roughness is required to be 1 nm or less. On the other hand, for the near ultraviolet region, the roughness can be of the order of 30 nm when the wavelength is 300 nm.

The current optical communication uses light of wavelengths from 800 to 1,000 nm. This is because the optical communication is used for the communication on the ground or the communication between the ground and satellites, and the loss caused by the atmosphere is intended to be avoided; it is anticipated that when the optical communication is used between satellites in the future, the communication using shorter wavelength light will be adopted because the loss caused by the atmosphere is not involved.

When a mirror is used for optical communication, the loss caused by reflection is crucial, so that it is necessary that the roughness of the mirror should be λ/20 or less, more preferably λ/50 or less.

In the case of the light of wavelengths from 800 to 1,000 nm currently used for optical communication, the roughness of the mirror is preferably λ/20 (40 nm) or less, more preferably λ/50 (16 nm).

On the contrary, the communication between satellites is free from the loss caused by the atmosphere, and hence may use even lower power lasers, and accordingly can also use semiconductor lasers. In this connection, the semiconductor laser using gallium nitride is shortest in wavelength, specifically the wavelength being 400 nm. In this case, the surface roughness is preferably λ/20 (20 nm) or less, more preferably λ/50 (8 nm) or less.

EXAMPLE 4

Figure 5A:
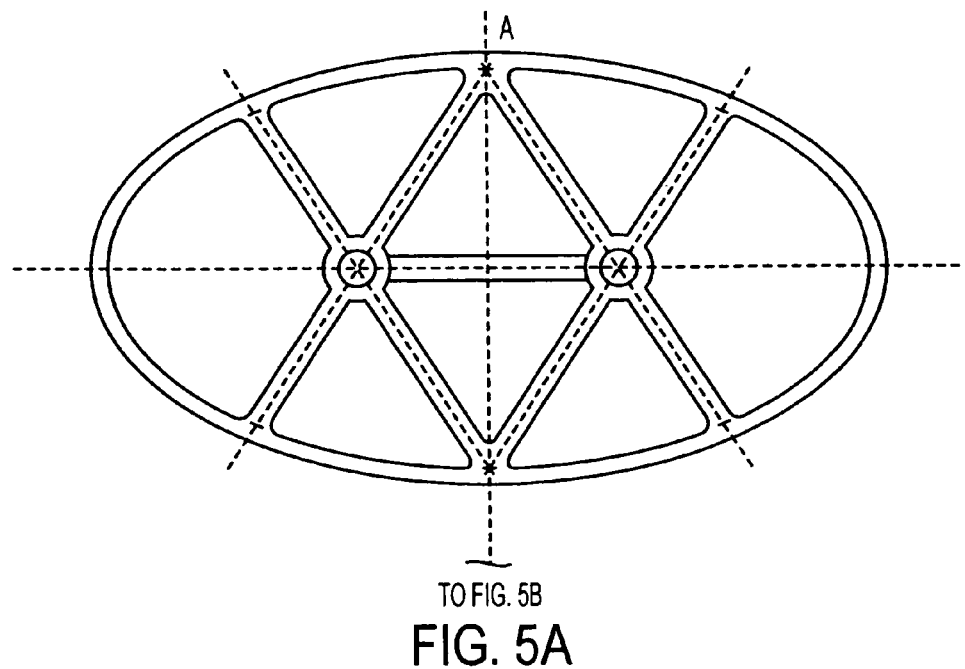
FIGS. 5a and 5b The structure of the back side of a mirror.
Figure 5B:

The particle dispersed silicon material is as small as 1% in contraction, and high both in rigidity and in strength although it is a sintered compact, so that the structure as shown in FIG. 5 can be adopted.

FIG. 5 shows a structure in which joists are provided on the back side of a mirror; the mirror is elliptical and the joists are in combination of trianglular joists and triangular joists in which one edge of the trigon has a curvature.

The provision of the joists on the back side serves to maintain the strength, so that the mirror can be made thinner and hence can be reduced in weight.

Figure 6A:
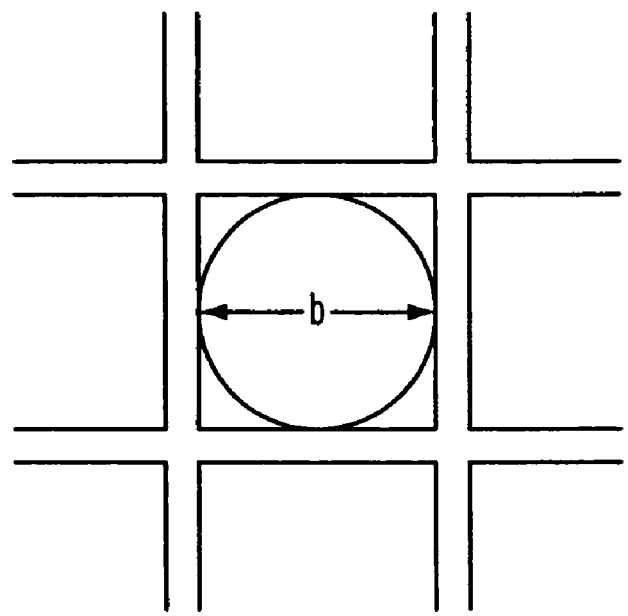
FIGS. 6a and 6b Schematic views of the back side structures of mirrors.
Figure 6B:
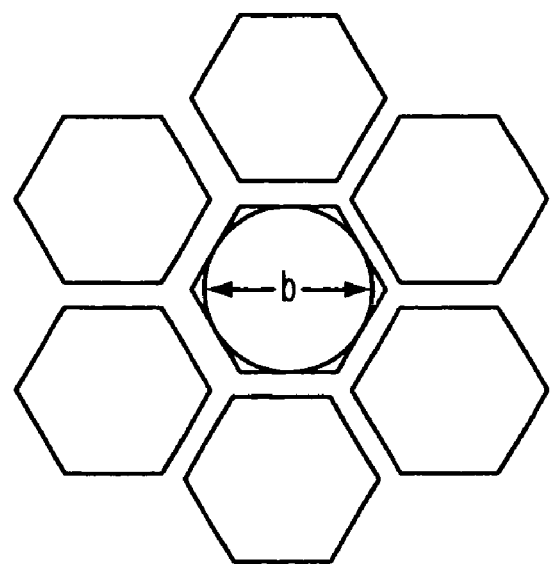
Figure 7A:
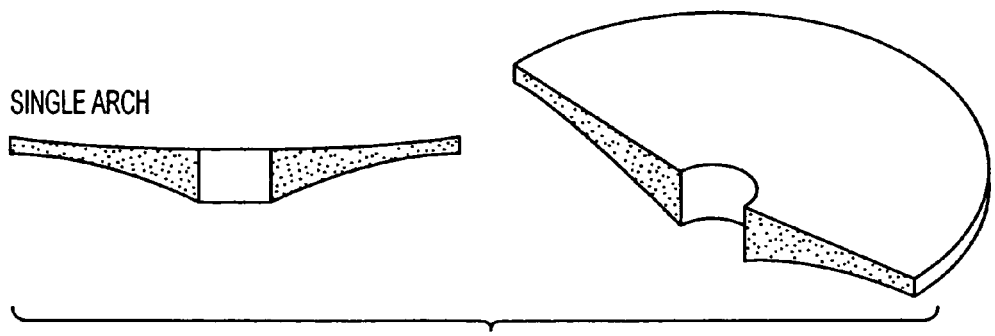
FIGS. 7a–7d Schematic views illustrating another structure of a mirror.
Figure 7B:
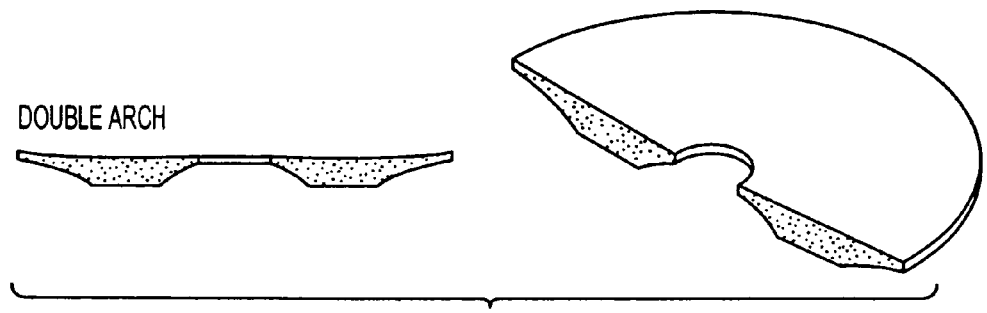
Figure 7C:
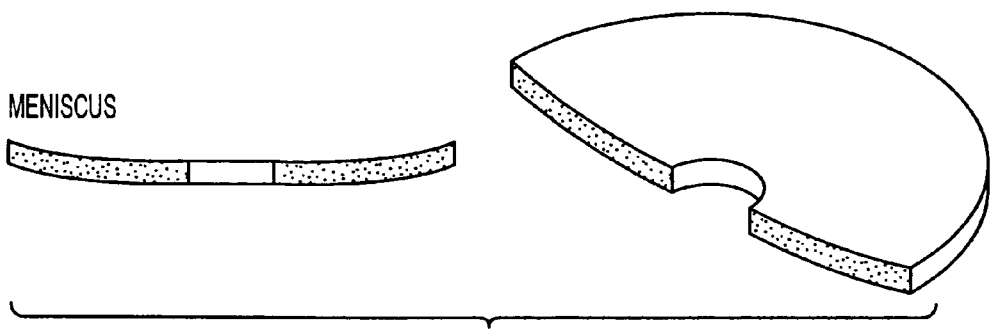
Figure 7D:
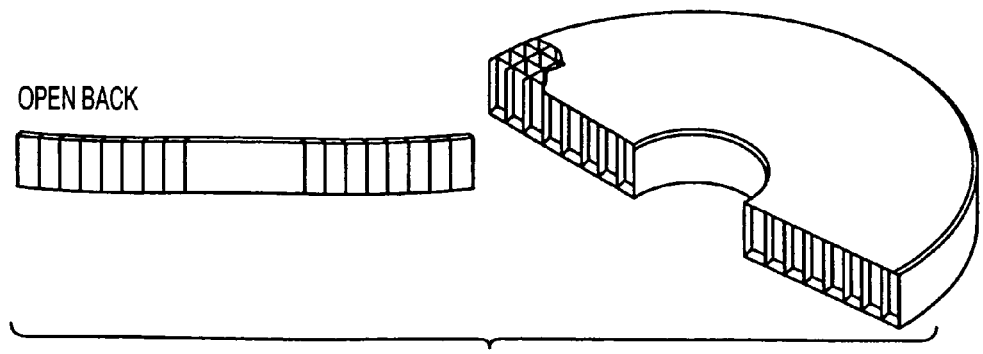

For the purpose of reduction of weight, the shape of the back side may adopt the shapes shown in FIG. 6. FIG. 6(a) shows squares for which the diameter of the inscribing circle is b, while FIG. 6(b) shows hexagons for which the diameter of the inscribing circle is b. Any polygons other than square and hexagon can yield similar effects.

EXAMPLE 5

Example 4 presents an example in which the strength of a mirror is provided by arranging joists; in this connection, Example 5 presents other examples in FIG. 7. FIG. 7(a) shows a single arch type in which the thickness is gradually decreased from the central portion toward the periphery of the mirror; FIG. 7(b) shows a double arch type in which the central portion and the periphery of the mirror are thinner and the portion between the central portion and the periphery of the mirror is thicker; FIG. 7(c) shows a meniscus type which is uniform in thickness and curved on the surface; and FIG. 7(d) shows an open back type in which a thin mirror is provided with joists on the back side thereof. In the case of the open back type, a structure may be adopted in which flat plates sandwich the joists as shown in FIG. 7(d).

EXAMPLE 6

Figure 8A:
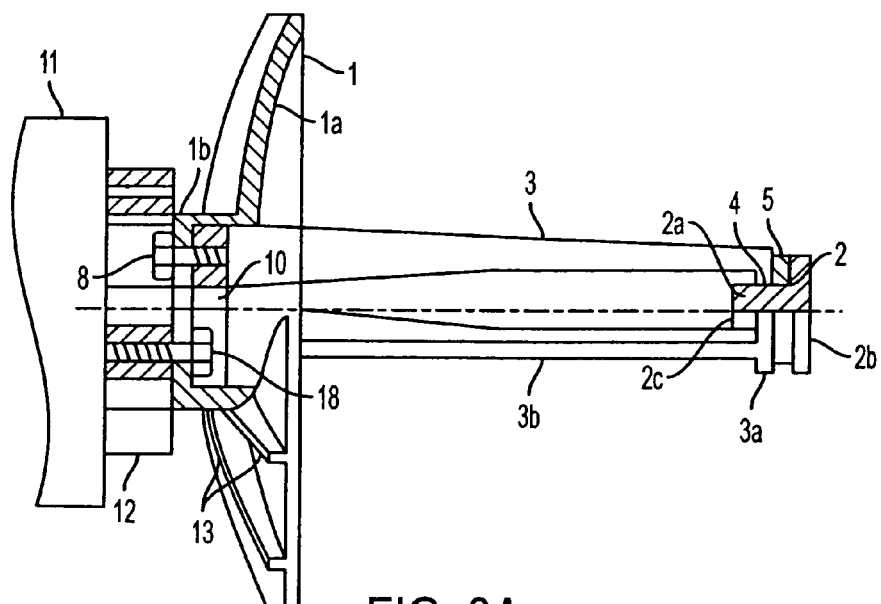
FIGS. 8a and 8b Schematic Views of a reflecting telescope.
Figure 8B:
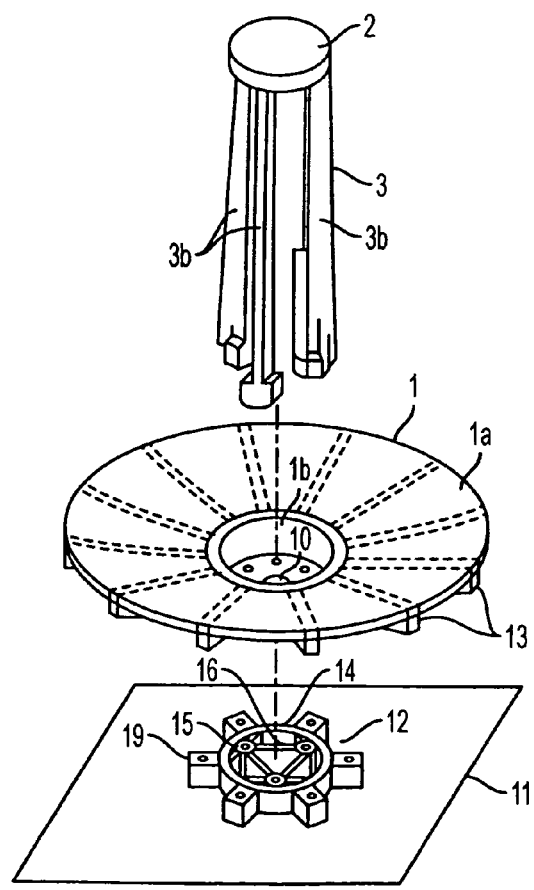

FIG. 8 shows a Cassegrainian reflecting telescope of Example 6. FIG. 8(a) shows a sectional view, while FIG. 8(b) shows the separated constituent parts.

The main mirror 1 is umbrella shaped. The concave surface 1a of the main mirror is formed as a surface reflecting the incident beam of light, and the reflecting surface has a concave paraboloid of revolution shape.

The main mirror 1 is formed in a thin shape for the purpose of reducing weight; a predetermined force is exerted to the main mirror when the reflecting surface 1a is subjected to the mirror finish processing, and moreover, the force for fixing supporting shafts 3b to the main mirror 1 with fixing screws 8 is exerted to the main mirror. Additionally, as will be described later, the force for fixing the main mirror 1 to a base portion 12 is exerted to the main mirror 1.

The main mirror is required to have a rigidity such that it is hardly deformable against these forces so as to maintain the measurement precision in a satisfactory condition. For that purpose, a plurality of ribs 13 are formed on the back side of the main mirror 1 to make a radial form in which the ribs are arranged with a predetermined interval along the periphery of the main mirror 1, so that the strength of the main mirror is improved. The shape of the above described ribs 13 is formed in such a way that the relation between the weight and the strength of the main mirror 1a is optimal, and the ridge of the rib is made to form a slightly curved parabolic line in consideration of the effect caused by the weight of the rib itself.

The material constituting the main mirror 1 is the particle dispersed silicon material used for the substrate, for the purpose of reducing weight, and the substrate is subjected to mirror finish polishing and thereafter the reflecting film is formed.

The particle dispersed silicon material comprising silicon carbide as dispersion particles is high both in strength and in rigidity, so that it permits adopting the above described structure.

A secondary mirror 2 is arranged to face the main mirror 1, and is supported by secondary mirror supporting member 3 constituting the secondary mirror supporting means. The secondary mirror supporting member 3 is provided with a base 3a for fixing the secondary mirror 2 at the top end thereof, and moreover, a plurality of supporting shafts 3b are arranged integrally in a protruding manner.

The secondary mirror fixing base 3a is disc shaped, a through-hole 4 for insertion is formed at the center of the base, and a protrusion 2a formed on the secondary mirror 2 is inserted therein. The secondary mirror 2 comprises a flange 2b and the protrusion 2a, the above described flange 2b and the secondary mirror fixing base 3a are approximately the same in diameter, a first spacer 5 is interposed therebetween, and thus the secondary mirror 2 is fixed with brackets not shown in the figure.

The reflecting surface 2c of the secondary mirror 2, facing the main mirror 1, is formed to have a convex paraboloid of revolution, the secondary mirror 2 has a substrate made of the particle dispersed silicon material comprising silicon carbide as dispersion particles, similarly to the main mirror 1, and the substrate is subjected to mirror finish polishing and thereafter the reflecting film is formed.

A plurality of the supporting shafts 3b constituting the secondary mirror supporting member 3 are provided to the secondary mirror fixing base 3a with a predetermined interval, 3 shafts being provided in the present example. The shafts are plate like members designed so that the shafts may be mutually nondeformable and may have a predetermined strength, and accordingly the shafts are formed in such a way that the sectional size of the shafts gradually grows on going from the secondary mirror fixing base 3a to the ends for fixing the main mirror 1.

The lower ends of the supporting shafts 3b are inserted into the sockets 1b formed in the central portion of the main mirror 1 with concave sections thereof, the positioning is made in such a way that the screw holes and the first holes for fixing arranged in the sockets 1b are communicated with each other. With fixing screws 8 that are the brackets inserted from the outer side of the sockets 1b, the secondary mirror supporting member 3 is fixed to the main mirror 1.

A base portion 12, the secondary mirror fixing member 3, the secondary mirror fixing base 3a, the first spacer 5, the brackets, and the fixing screws are made of the particle dispersed silicon material comprising silicon carbide as dispersion particles as the base material thereof.

Since the materials for the main mirror, secondary mirror and truss are the same, the linear expansion coefficients of all the parts are identical. When the whole body is maintained at a constant temperature, all the parts undergo similar deformations. Consequently, no variations are caused in the image formation properties and the focal position of the optical system. Thus, an optical system optimal for the high precision optical system can be obtained.

Both of the shapes of the back side of the main mirror 1 shown in FIGS. 5 and 7 apparently lead to similar results.

Additionally, in the case shown in FIG. 4(b), where the incident beam of light is reflected by the first reflecting surface (corresponding to the main mirror 1 in FIG. 8) and focused on the detector, needless to say, the detector has only to be arranged at the position of the secondary mirror 3 in FIG. 8.

Incidentally, the telescope shown in FIG. 8 can be used as a communication antenna. Furthermore, needless to say, the configuration is not restricted to that shown in FIG. 8, but a variety of configurations can be applied.

What is claimed is:

1. A mirror substrate, wherein the substrate is made of a particle-dispersed silicon material composed of silicon carbide and silicon, and the surface of said substrate to be used as a reflecting surface is polished to a mirror finish,
   wherein the Vickers hardness of said mirror substrate is 1,500 Hv or more, the 3 point bending hardness is 500 MPa or more, and the thermal conductivity is 100 W/m-K or more.

2. The mirror substrate according to claim 1, wherein said mirror is concave.

3. The mirror substrate according to claim 1, wherein said mirror is convex.

4. The mirror substrate according to claim 1, wherein said mirror is planar.

5. The mirror substrate according to claim 1, wherein the maximum diameter of the concavities and convexities or pores on the surface of said mirror substrate is 40 nm or less.

6. The mirror substrate according to claim 1, wherein the maximum diameter of the concavities and convexities or pores is 20 nm or less.

7. The mirror substrate according to claim 5 or 6, wherein the concavities and convexities or pores on the surface of said mirror occupy 3% or less of the area of said mirror surface.

8. The mirror substrate of claim 1, further comprising a reflecting film provided on a surface of said mirror substrate.

9. The mirror substrate according to claim 8, wherein said reflecting film is made of a metal.

10. The mirror substrate according to claim 9, wherein said metal comprises gold, aluminum, silver or rhodium.

11. The mirror substrate according to claim 8, wherein said reflecting film comprises a multilayer dielectric film.

12. A mirror substrate, wherein the substrate is made of a particle-dispersed silicon material composed of silicon carbide and silicon, and the surface of said substrate is to be used as a reflecting surface is polished to a mirror finish,
    wherein the maximum diameter of the concavities and convexities, or pores on the surface of said mirror substrate is 40 nm or less.

13. A mirror substrate made of a particle-dispersed silicon material composed of silicon carbide and silicon, and the surface of said substrate is to be used as a reflecting surface is polished to a mirror finish,
    wherein a maximum diameter of concavities and convexities, or pores is 20 nm or less.

14. The mirror substrate according to claim 12, wherein the concavities and convexities, and pores on the surface of said mirror occupy 2% or less of the area of said mirror surface.

15. The mirror substrate according to claim 13 wherein the concavities and convexities, and pores on the surface of said mirror occupy 2% or less of the area of said mirror surface.

16. An optical device, wherein the mirror substrate as in any one of claims 8, 11 and 12 is employed as a reflecting mirror.

17. The optical device according to claim 16, wherein said optical device is a reflecting telescope.

18. The optical device according to claim 17, wherein the optical device comprises a mirror reflecting the incident light beam and thereafter focusing the incident light beam on a detector.

19. The optical device according to claim 17, further comprising a detector, wherein said detector of said optical device is an image sensor.

20. The optical device according to claim 16, wherein said optical device is a reflecting communication antenna.

21. The optical device according to claim 20 further comprising a detector, wherein said detector of said optical device is a photodetector.

22. The optical device according to claim 16, wherein the optical device comprises a first mirror for reflecting the incident light beam and thereafter focusing the light beam on a second mirror and the second mirror reflecting said focused light beam and thereafter focusing the light beam on a detector.

23. The optical device according to any one of claim 16, further comprising:
structural members for supporting said mirror substrate,
wherein said structural members comprise said particle dispersed silicon material composed of silicon carbide and silicon.

* * * * *